3,134,661
COMPOSITION FOR THE TREATMENT OF
CUT FLOWERS
John B. Sheppard, 1009 S. Beckham Ave., Tyler, Tex.
No Drawing. Filed Feb. 20, 1961, Ser. No. 90,216
8 Claims. (Cl. 71—2.3)

This invention relates to the treatment of cut flowers, leaves, branches, and other portions of plants which have been severed from the plant system, and, in particular relates to a composition which is adapted to be dissolved in water in which the severed plants are placed so as to preserve, prolong, and enhance the useful life of such plants. Another phase of the invention relates to the preparation of the composition in dry, substantially free-flowing form in which all of the ingredients are maintained in proper distribution and in which all ingredients are readily soluble in water.

For convenience in storing, shipping and general use, the composition is prepared in the form of a powder. But if desired, it could be produced in the form of tablet, paste or liquid. It may also be combined in any of these forms with other materials, such as floral bases supplying water to the stems of cut flowers in arrangements, etc., lending its benefits to such applications.

This composition is intended, among other things, to do the following:

(1) Provide a source of nutrition capable of being utilized by the flower or other plant material, so that it will continue to mature and develop.

(2) Provide a means of slowing-down the respiration or metabolism of the flower or other plant material, so that the useful life after cutting is prolonged.

(3) Keep the water-conducting vessels and tissue of the flower stem open and functioning, so that the flower can draw water as needed.

(4) Harden the stems, prevent wilting and shattering of the blossoms.

(5) Retard or prevent the development of molds and bacteria in the water, which would otherwise clog the water-conducting tubes and result in damage to the flower.

(6) Produce a specific acidity (approximately pH 4.0) in the water solution, which pH has been found to enhance the performance of flower-preservatives.

Many attempts have been made to provide preservative compositions for cut flowers which will not only serve as a source of food for sustaining plant growth, but will also prevent bacterial development within the water solution and the cells of the flowers. These efforts have met with varying degrees of success, but still leave much to be desired.

It is an object of this invention to provide a new and improved combination of ingredients for treatment of cut flowers, leaves, branches, and other severed portions of plants.

Another general object of the invention is to provide a multi-purpose plant preservative and nutrient composition for cut flowers or other plants which will insure good appearance for a long period of time.

Another object of the invention is the provision of a composition of the type described wherein the various ingredients cooperate in a special manner to provide the necessary chemical reactions to allow the cut flowers or plants to continue their development, prevent bacterial attack, and regulate their growth so that a more prolonged and useful life may be achieved.

Another object of the invention is to provide the novel plant treating composition in granular, free-flowing form readily soluble in water and which will not cake or discolor under normal storage conditions.

A further object is to provide a method for the preparation of the plant treating composition in the aforesaid dry, granular, readily water soluble form.

The composition of the invention in its broad aspects, comprises a major proportion of a water soluble nutrient which can be utilized by the cut flower or other portion of the plant as an energy source and minor amounts of benzoic acid, salicylanilide, and a non-ionic wetting agent.

In general, the proportions of these ingredients can vary between the following limits (all proportions being specified as parts by weight per million parts of water):

| | P.p.m |
|---|---|
| Nutrient (sucrose or dextrose) | 5000–50,000 |
| Benzoic acid | 100–500 |
| Salicylanilide | 30–100 |
| Wetting agent | Up to 25 |

It will be understood that the proportions can be varied to best suit the particular flowers or plants being treated.

While any of the great number of nutrients known to the art may be used in the present composition, the nutrient generally employed consists mainly of sugar, such as sucrose or dextrose. This is employed as a base material to which the other ingredients are added in the desired quantities and proportions.

The sugar provides a source of nutrition capable of being utilized by the flower or other plant so that it will continue to mature and develop. Either sucrose or dextrose or combinations thereof (as well as other carbohydrates) may be employed.

However, the preferred nutrient is sucrose, particularly where the composition is to be used in the treatment of roses. It has been found that there is a measurable advantage in using sucrose as compared to dextrose in the treatment of cut roses. With other cut flowers, the difference is slight. It is believed that the sucrose when dissolved in the solution under the conditions of acidity provided by the benzoic acid undergoes at least partial inversion to dextrose and levulose, thereby providing a balance of sugars better utilizable by the flowers. Regardless of theory, test roses were found to grow larger and retain their color longer when sucrose was substituted for dextrose in the composition.

While proportions of nutrient sufficient to provide from about 5,000 to 50,000 parts by weight per million parts of water may be used, to facilitate storing, packaging and shipping and provide a more economical and less bulky product, I usually employ a weight proportion of sugar to water solution in the range of 10,000 to 11,500 p.p.m. This ratio will allow a two-fluid ounce measure of the composition to properly treat one gallon of water. In general, the exact proportion of the chosen nutrient is non-critical and the amount used per gallon of water is more nearly governed by bulk and cost factors as set forth above.

The benzoic acid functions as a stimulant for the growth of the cut flowers or plants and maintains the pH of the water into which the stems are immersed at about 4.0, the optimum acidity for performance of the other ingredients of the composition. If the solution becomes more alkaline the blossoms will wilt more rapidly and if the pH falls substantially below 4, the stems will not remain rigid and fibrous. Benzoic acid has been found superior to all known acidic substances in the present combination of ingredients. Besides its acidic effects, benzoic acid retards the development of both bacteria and fungi, and acts as a powerful stimulant.

When used alone, benzoic acid will cause rapid maturing of blossoms followed by early shattering. In order to control the stimulating action of the benzoic acid and take advantage of its desired effect, the present invention makes use of salicylanilide, which functions to retard development and lower the respiration of the flower. Salicylanilide also has a fungus retarding action. The two-fold action of the benzoic acid and salicylanilide, when used in properly balanced proportions, results in a measurable lengthening of cut-flower life. The combination of stimulating and restraining factors produces a controlled development and growth of the cut flower, or other plant material, such as greenery or foliages.

The desired effects of the benzoic acid and salicylanilide are enhanced by the use of a small amount of wetting agent of the non-ionic type. The wetting agents known under the name "Tween," sold by the Atlas Powder Company and said to be polyoxyethylene derivatives of hexitol anhydride partial long chain fatty acid esters, have been found to be especially suitable. The wetting agent must be compatible with the other ingredients of the composition and must not adversely affect plant life. The quantity of wetting agent must be limited, since too much wetting agent has been found to prevent absorption by the flower stem, resulting in rapid wilting. With wetting agents of the "Tween" type, the upper limit is about 25 p.p.m. with lesser amounts providing better results.

The wetting agent also insures that the water-conducting vessels and tissues of the flower stem will remain open in order for the blossoms to draw nutrient when necessary.

Contrary to the nutrient ingredient, the particular proportions of the other constituents are critical and a balance must be maintained between them to obtain the optimum results. This is due, in part, to the fact that benzoic acid and salicylanilide have diverse effects on the rate of growth and maturing of the flowers. As previously described, benzoic acid reduces the pH of the water solution to 4, which is approximately the pH which the flower has prior to being cut. By eliminating a pH gradient between the flower and the preservative, the fluids within the flower will tend to remain in the tissues and not diffuse to the solution and the nutrient will be more readily absorbed into the tissues of the flower. However, this absorption of nutrient will cause the blossoms to mature rapidly. The salicylanilide, on the other hand, slows down the rate at which the nutrient is assimilated by the plant by lowering its respiration and metabolism. It has been found that the range of acceptable variation in the case of roses appears to vary from a minimum of 100 p.p.m. to a maximum of 150 p.p.m. for benzoic acid, and 30 to 60 p.p.m. for salicylanilide. Flowers such as mums, carnations, and asters tolerate a much wider range.

The invention will be further illustrated by the following examples:

*Example I*

A flower-preservative composition for roses is as follows:

| | P.p.m. |
|---|---|
| Sucrose | 10,000 |
| Dextrose | 3,000 |
| Benzoic acid | 135 |
| Salicylanilide | 57 |
| Polyoxyethylene sorbitan monooleate (Tween 80) | 15 |

*Example II*

A cut flower preservative composition for the treatment of asters, carnations, etc., is as follows:

| | P.p.m. |
|---|---|
| Dextrose | 10,000 |
| Benzoic acid | 333 |
| Salicylanilide | 33 |
| Tween 80 | 22.5 |

An important feature of this invention is the method by which the new composition may be made. Benzoic acid and salicylanilide are solids which have low water solubilities. The nutrient sugar is a solid with high water solubilty. The wetting agent is purchased in liquid form. If these ingredients were merely mixed together it would be difficult to obtain homogeneity. Moreover, the relatively slowly soluble solids may not become immediately available in the water to which the mixture is added. In accordance with this invention, the slowly water-soluble solids are coated on the surface of the particles of water-soluble nutrient. They may be deposited on such particles from a volatile solvent in which they are soluble. A convenient solvent for this purpose is ethanol, which preferably is substantially anhydrous. Other solvents in which the ingredients are soluble can, of course, be used. One advantage of alcohols is that they may either be evaporated or left wholly or partially in the mixture where they add nutrient value to the composition. The benzoic acid salicylanilide and wetting agent are dissolved in the alcohol, using the minimum quantity which will permit ready solution. The dissolved chemicals are then poured over the sugar granules, and the entire mix is tumbled in a cylindrical drum until the sugar granules are uniformly wetted by the alcohol solution. By continuing the tumbling process and by blowing air over the mix, the alcohol is evaporated and a minute film of the dissolved chemicals is coated on each sugar granule. An unexpected result of this coating is to partially "lump-proof" the sugar base material so that it does not cohere and form a hard cake as other preservatives containing sugar nutrients. Moreover, this method prevents separation of the ingredients during storage and insures a more uniform powder for use. Upon admixture of a portion of the composition with the water to which the stems of the cut flowers or other plants are immersed, the water will contain a proper proportion of all the necessary constituents.

*Example III*

3.33 pounds of benzoic acid, 0.33 pounds of salicylanilide and 3.5 fluid ounces of "Tween 80" were mixed with 1.5 gallons of anhydrous denatured ethanol until all ingredients were dissolved. 100 pounds of dextrose was placed in a polyethylene tumbling drum tilted at about 25 degrees to the horizontal. The solution was poured over the dextrose in the drum and all ingredients were tumbled at approximately 32 r.p.m., adequate ventilation being provided to take care of evaporation of the alcohol. The mixture was removed when no longer cool to the touch and after the odor of alcohol had substantially disappeared.

The resulting powder is packaged in suitable portions for addition to a measured amount of water to provide the proper concentration as previously given, or compressed into tablets with the aid of conventional water soluble binders. It may also be incorporated in floral bases into which flower and foliage stems are inserted to make floral arrangements, funeral designs, etc. One such base material consists of a vermiculite material containing a binder which may be mixed with water and formed around the stems of flowers or foliage. The material then "sets up" or hardens after a short time, thereby holding the flower stems despite handling of the arrangement. The present composition can be incorporated in the base material at the time of manufacture or added to the water used to prepare the mass for forming around the flower stems.

Having thus described my invention, it will be understood that such description has been given by way of illustration and example and not by way of limitation, reference for the latter purpose being had to the appended claims.

I claim:

1. A composition of matter for preserving and enhancing the useful life of cut flowers and other severed portions of plants comprising 5,000 to 50,000 parts by weight of a plant nutrient sugar, 100 to 500 parts by weight of benzoic acid, 30 to 100 parts by weight of salicylanilide, and up to 25 parts by weight of a non-ionic wetting agent.

2. The composition as defined in claim 1 where in the non-ionic wetting agent is a polyoxyethylene derivative of a hexitol anhydride partial long chain fatty acid.

3. The composition as defined in claim 1 wherein the plant nutrient sugar is selected from the group consisting of dextrose and sucrose and mixtures thereof.

4. A composition of matter for preserving and enhancing the useful life of cut flowers and other severed portions of plants comprising approximately 10,000 to 15,000 parts by weight of sucrose, 100 to 150 parts by weight of benzoic acid, 30 to 60 parts by weight of salicylanilide, and up to 20 parts by weight of polyoxyethylene sorbitan monooleate.

5. A composition of matter for preserving the life of cut flowers and other severed portions of plants by addition to the water in which the stems of the cut flowers or other plants are immersed comprising about 10,000 parts sucrose, about 3,000 parts dextrose, 135 parts benzoic acid, 57 parts salicylanilide, and 15 parts of polyoxyethylenesorbitan monooleate.

6. An aqueous solution for treatment of cut flowers and other severed portions of plants, comprising 5,000 to 50,000 p.p.m. of a plant nutrient sugar, 100 to 500 p.p.m. of benzoic acid, 30 to 100 p.p.m. of salicylanilide, and up to 25 p.p.m. of a non-ionic wetting agent, said solution having a pH of approximately 4.0.

7. An aqueous solution for treatment of cut flowers and other severed portions of plants, comprising 10,000 to 15,000 p.p.m. sucrose, 100 to 150 p.p.m. benzoic acid, 30 to 60 p.p.m. of salicylanilide, and up to 20 p.p.m. of polyoxyethylene sorbitan monooleate wetting agent, the solution having a pH of approximately 4.0.

8. A water-soluble, substantially non-caking granular product for addition to water for preservation and enhancement of the useful life of cut flowers and other severed portions of plants comprising the composition of claim 2 wherein the particles of sugar have a surface coating comprising the benzoic acid, salicylanilide, and non-ionic wetting agent constituents of the composition.

References Cited in the file of this patent

UNITED STATES PATENTS

| | | |
|---|---|---|
| 2,805,137 | Clopton | Sept. 3, 1957 |
| 2,971,292 | Malecki | Feb. 14, 1961 |

OTHER REFERENCES

Martin: "Guide to the Chemicals Used in Crop Protection," Canada Department of Agriculutre (Third Edition), October 1957, page 261.